United States Patent
Secord

[19]

[11] Patent Number: 5,654,023
[45] Date of Patent: Aug. 5, 1997

[54] METHOD FOR SHAPING AND COOKING BEEF

[76] Inventor: John L. Secord, 2711 Horton Rd., Jackson, Mich. 49203

[21] Appl. No.: 498,365

[22] Filed: Jul. 5, 1995

[51] Int. Cl.$^6$ .............................. A23L 1/31; A23P 1/10; B65B 25/22
[52] U.S. Cl. .................. 426/412; 426/414; 426/513; 426/129
[58] Field of Search .................. 426/129, 414, 426/513, 412, 132, 105, 135

[56] References Cited

U.S. PATENT DOCUMENTS

| | | | |
|---|---|---|---|
| 1,505,218 | 8/1924 | Saratore | 426/105 |
| 1,880,679 | 10/1932 | Benn | 426/513 |
| 2,140,162 | 12/1938 | McKee | 426/132 |
| 2,733,153 | 1/1956 | Hammerberg | 426/513 |
| 2,779,681 | 1/1957 | Sell et al. | 426/513 |
| 3,011,895 | 12/1961 | Toepper et al. | 426/513 |
| 3,480,449 | 11/1969 | Sumption | 426/513 |
| 3,864,494 | 2/1975 | Kupcikevicius et al. | 426/105 |
| 4,057,653 | 11/1977 | Borsuk et al. | 426/513 |
| 4,466,465 | 8/1984 | Frey | 426/105 |
| 4,466,466 | 8/1984 | Ravdys | 426/105 |
| 4,574,087 | 3/1986 | Sheehy et al. | 426/129 |
| 4,621,482 | 11/1986 | Crevasse et al. | 426/105 |

FOREIGN PATENT DOCUMENTS

| | | | |
|---|---|---|---|
| 5465522 | 9/1957 | Canada | 426/513 |
| 164164 | 2/1905 | Germany | 426/132 |
| 800937 | 9/1958 | United Kingdom | 426/132 |

OTHER PUBLICATIONS

Meat Industry Mar. 1982, Cke's New Massage for Frozen Beef

*Primary Examiner*—Steven Weinstein
*Attorney, Agent, or Firm*—Duncan F. Beaman

[57] ABSTRACT

Meat, particularly beef prime rib, of an elongated form having ends is, prior to cooking, shaped at its ends by substantially flat retaining elements whereby the ends are maintained substantially perpendicular to the longitudinal length of the meat form wherein, upon cooking, the meat form will retain the cooked form having "squared" ends. A variety of devices may be employed to engage and shape the meat form ends, and in most instances, the meat form will be encased within a heat shrunk bag, and may also be encased within mesh netting.

2 Claims, 3 Drawing Sheets

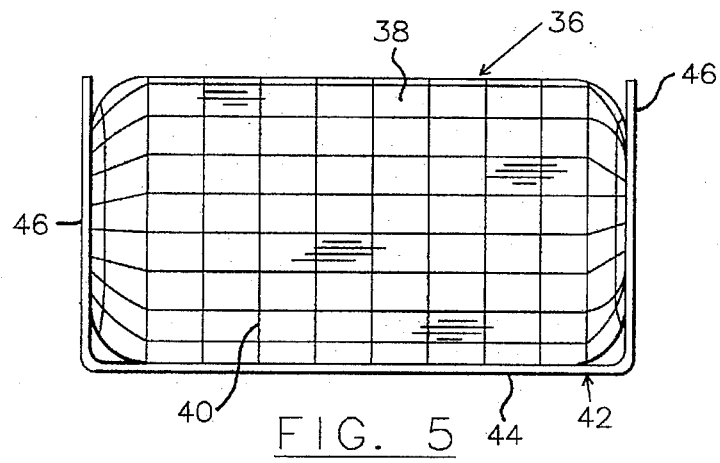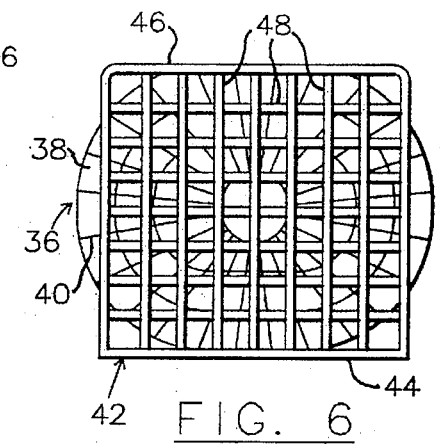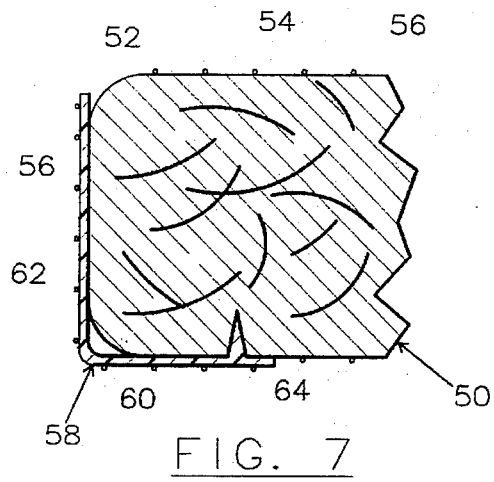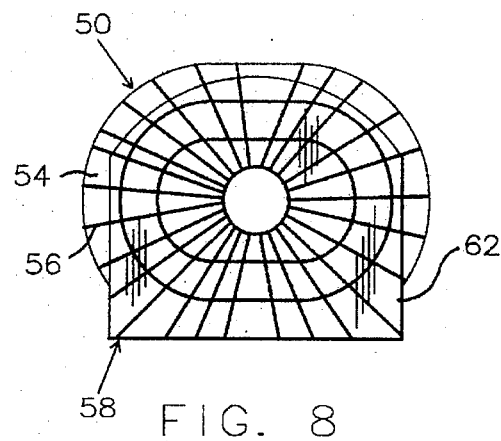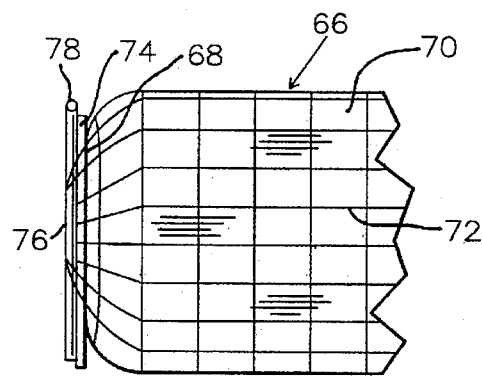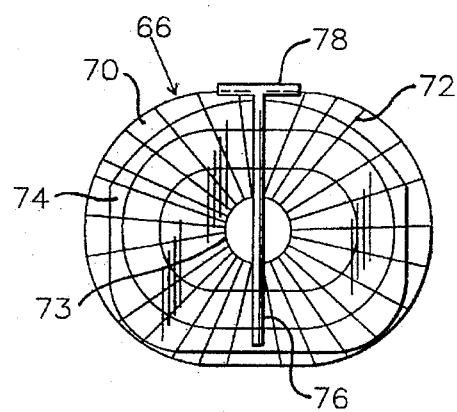

METHOD FOR SHAPING AND COOKING BEEF

BACKGROUND OF THE INVENTION

1. Field of the Invention

The invention pertains to the process and apparatus for shaping elongated meat forms during cooking wherein the meat form will be shaped to have substantially squared ends and will retain such configuration after cooking. A variety of devices are proposed for the shaping of the meat form during cooking.

2. Description of the Related Art

Beef prime rib is often encased within heat shrunk bags or envelopes prior to cooking. The use of such envelopes aids in shaping the longitudinal cross sectional configuration of the meat form, retains juices during cooking, and has other advantageous attributes.

Also, it is known to encompass meat such as beef prime rib with a mesh or net wherein the net aids in the cross sectional shaping of the meat form during cooking, and it is common to employ, simultaneously, a heat shrinkable envelope and mesh netting to encompass a long beef prime rib muscle during cooking. Such a circumferentially encased prime rib will preferably have a pear cross sectional configuration, but the chuck and loin ends of the boneless beef rib muscle will become generally flattened and somewhat pointed wherein the ends of the form are thin and generally unusable.

In the past, the ends of beef prime rib long muscle are often discarded and lost. While it is known to cook meats, such as ham and the like, within cans and molds whereby the meat will be held in a predetermined shape during cooking, to the knowledge of the inventor, prime beef rib has not been shaped prior to cooking wherein the ends of the meat form are of sufficient shape and thickness as to permit commercial sale thereof.

OBJECTS OF THE INVENTION

It is an object of the invention to provide a process for cooking elongated meat forms, particularly consisting of a single muscle, wherein the ends of the meat form are shaped, confined and pressed to square the ends of the meat form with respect to the form's longitudinal length whereby such squared configuration is maintained subsequent to cooking.

Another object of the invention is to provide a process for shaping beef prime rib wherein the ends of the prime rib form are shaped by a substantially flat element during cooking to impart to the meat form ends a flat configuration substantially perpendicular to the form longitudinal length, to achieve the desired squared end.

Yet another object of the invention is to provide apparatus for shaping the end of an elongated beef prime rib form which may be used with either or both a heat shrinking bag encompassing the meat form and a mesh net encompassing the form.

An additional object of the invention is to provide a variety of devices for shaping the ends of a prime beef rib during cooking wherein such shaping elements are inexpensive, yet are effective to achieve the desired result.

Yet an additional object of the invention is to provide a method for shaping the elongated form of a beef prime rib wherein the ends of the prime rib are substantially squared wherein the process may be incorporated with roll stock packaging systems.

SUMMARY OF THE INVENTION

Premium beef prime rib consists of a single elongated muscle having a naturally sloping or narrow loin end, and in a similar manner the chuck end will be narrower than the central region of the rib form. It is common practice to envelop the prime rib in a heat shrinking synthetic bag, in which the meat is cooked, and also, it is conventional to encase the bag within a netted fabric material. Such use of an envelope and/or mesh net will keep the prime rib form from becoming flat, and preferably, the transverse cross sectional configuration of a premium beef prime rib is of a pear or tear drop configuration, as shaped by the envelope or net.

The envelope or net do not change the narrowing or sloping natural configuration of the ends of the rib form, and in order to produce a "squared" end at the meat form, it is necessary to engage the form ends, compress the form, and hold the shaped meat form during cooking so as to permit the meat form to be maintained after cooking.

To reduce waste, conserve space, permit consistent cooking and provide a more attractive product, it is highly desirable that the ends of an elongated form of beef prime rib be "squared" wherein the dimensions of a slice of prime rib taken adjacent the end the meat form will be of a dimension and shape substantially similar to that of a slice taken at a location remote from a meat form end.

In order to achieve a squared prime beef rib end of an elongated form of a single prime rib muscle, a substantially rigid end forming element is located in an engaging relationship at the ends of the form end so as to maintain the form ends substantially flat or planar during cooking. This element, in one embodiment of the invention, is held in position relative to the meat form end by arms engaging the mesh netting surrounding the meat form.

In other embodiments, the end engaging elements may take the form of legs of a U-shaped member receiving the meat form between the legs wherein the meat form will be maintained in a longitudinally compressed condition squaring the form ends. Other variations include elements which are of an L configuration having a piercing projection capable of entering the meat and maintaining the location of a form end engaging portion of the element in contact with the form end. Another embodiment includes a flat element held in position against the form end by a pin inserted through the mesh netting.

The inventive concepts can also be practiced with high production roll stock packaging whereby a rigid element may be incorporated into the shrink packaged form end during the generation of the vacuum wherein the shrink wrap or envelope encompasses the end engaging elements and holds the same in tight relationship to the ends of the meat form. In such an instance, the meat will be sold with the end forming elements in position.

As the meat is cooked while the ends of the meat form are compressed and shaped, the meat form will substantially retain the compressed configuration after cooking, and upon removal of the shaping elements, the desired squared end of the meat form will be maintained. The elements used to shape the meat form ends are formed of a sanitary cleanable material, such as stainless steel, or high temperature resistant synthetic plastic, and the invention may be practiced by workers having ordinary skills.

BRIEF DESCRIPTION OF THE DRAWINGS

The aforementioned objects and advantages of the invention will be appreciated from the following description and accompanying drawings wherein:

FIG. 5 is a side elevational view of a meat form located within a U-shaped cooking element shaping the meat form ends, FIG. 6 is an end view of the embodiment of FIG. 5 as taken from the right side thereof, FIG. 7 is a detail sectional view of a meat form end using another embodiment of the invention wherein the end engaging element includes a meat piercing projection, FIG. 8 is an elevational view of the meat form engaging element shown in FIG. 7 as taken from the left end thereof, FIG. 9 is an elevational detail view of a meat form utilizing an element held in position by a pin inserted through the mesh netting, FIG. 10 is an elevational end view as taken from the left of FIG. 9.

DESCRIPTION OF THE PREFERRED EMBODIMENTS

Figure 1:
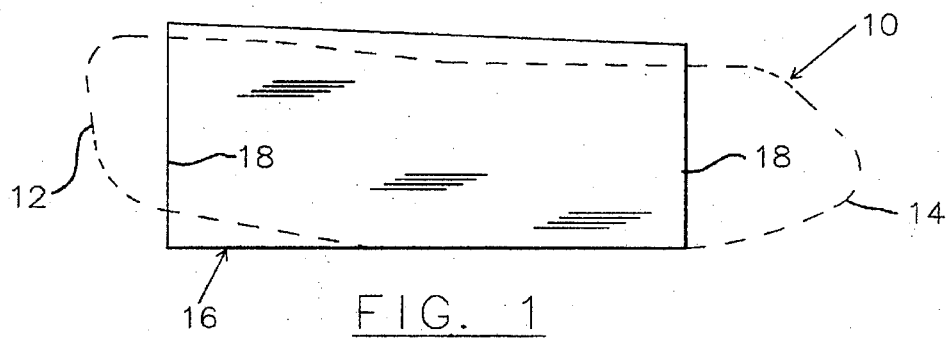
FIG. 1 is a side elevational view of a beef prime rib form illustrated in its natural configuration in dotted lines, and in its squared configuration after utilization of the invention, in solid lines.

FIG. 1 schematically illustrates a typical prime beef rib of a conventional form as compared to the meat form desired and achieved by the practice of the invention. In FIG. 1, the conventional meat form is generally indicated at 10 as outlined in dotted lines. Beef prime rib is usually boneless and consists of a single beef muscle. The meat form includes chuck and loin ends such as at 12 and 14, and the configuration of the ends 12 and 14 is a result of the shape of the beef muscle and, as will be appreciated in FIG. 1, is of a natural rounded and narrowed configuration. In most beef prime rib forms of conventional configuration, the meat adjacent the ends 12 and 14 is often lost or wasted due to the narrowing and configuration of the ends.

A meat form for beef prime rib in accord with the invention is illustrated in full lines in FIG. 1 at 16, and is substantially of a rectangular configuration having ends 18 of a generally planar form which are transversely disposed, preferably perpendicularly disposed, to the longitudinal axis of the meat form 16. A meat form 16 with the "squared" ends 18 permits all of the beef prime rib to be utilized and a uniform and attractive appearance is achieved when the beef form has the squared ends produced by the invention.

Figure 2:
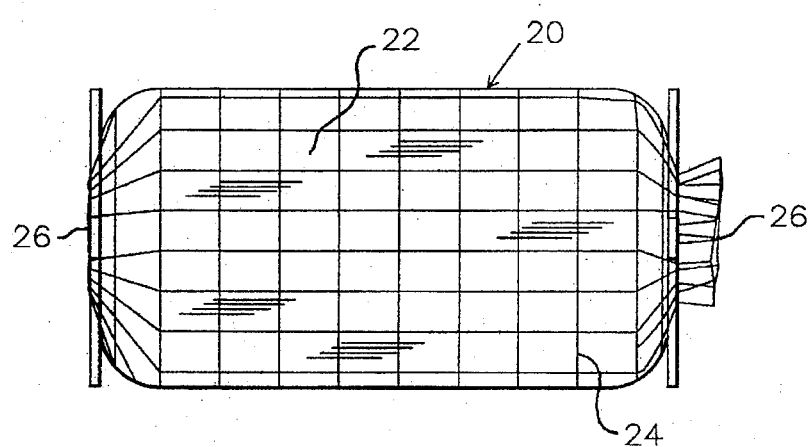
FIG. 2 is a side elevational view of a beef prime rib form encompassed within a shrink wrap and mesh netting envelopes, having an end engaging element utilizing arms in position against the form ends prior to cooking.

FIG. 2 illustrates one embodiment of the invention wherein the beef prime rib form is generally indicated at 20. The meat form is located within a bag 22, and the bag 22 is formed of a shrinkable material capable of withstanding heat, as is commonly used in the cooking of prime beef rib. The form 20 and bag 22 is encased within a mesh net 24 of high temperature resistant material as is well known in the meat cooking art. The net 24 includes openings 26 at the ends of the meat form and these openings can be opened or closed as they are stretched or contracted.

Figure 3:
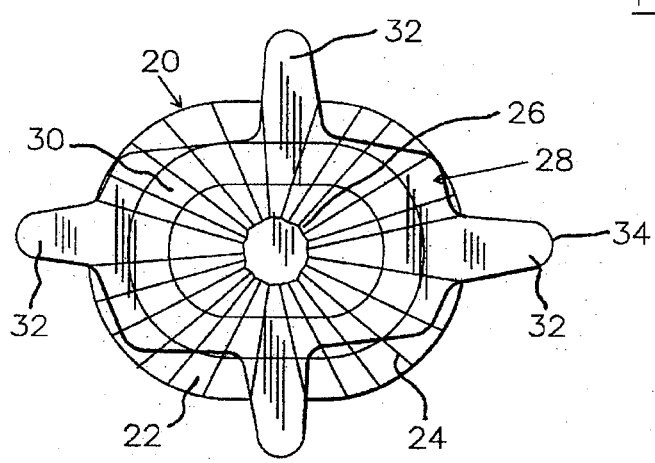
FIG. 3 is an end view as taken from the left end of FIG. 2.
Figure 4:
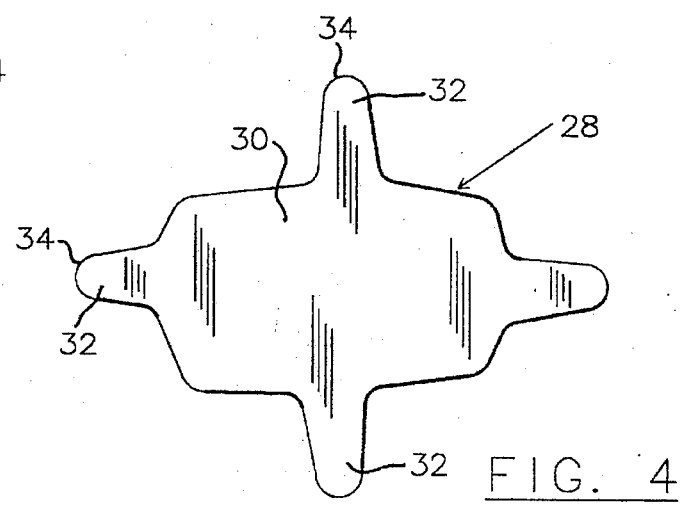
FIG. 4 is an elevational view of the meat form end engaging element, per se, used in FIGS. 2 and 3.

The ends of the meat form 20 are compressed, engaged and formed by the forming element 28 which is preferably of a single piece of stainless steel sheet material having a central flat generally rigid body 30 from which arms 32 extend in a generally radial manner, FIG. 3. The arms 32 are provided with radiused ends 34.

In the practice of the invention, the meat form 20 located within the cooking bag 22 and the shaping mesh net 24, all of which is conventional, is modified by stretching the mesh net openings 26 at each end 18 whereby the forming element 28 may be inserted within the net 24 through an end opening 26. The forming element 28 is placed against the cooking bag 22 ends, and the arms 32 are inserted through the openings in the mesh net. In this manner, it is possible to shape the meat form ends in a substantially squared manner as shown in FIG. 2, and the insertion of the arms 32 through the openings in the mesh net 24 position and maintain the element 28 against the meat form ends and compress the meat form to produce the desired squared and flat ends. The meat form 20 is then cooked with the elements 28 in place. Usually, beef prime rib is slowly cooked, and the engagement of the elements 28 with the ends of the meat form 20 causes the meat at the meat form ends to cook while being held in the flattened squared position. After cooking is completed, the elements 28 may be removed from within the ends of the mesh net 24 through the openings 26, and the meat form 20 will now have a permanent "squared" configuration generally similar to the meat configuration form shown at 16, FIG. 1.

The elements 28 may then be cleaned and again used. As the meat form 20 will retain its squared end configuration after cooking, slicing of the meat adjacent the form ends produces a slice configuration substantially uniform throughout the entire meat form length, which is not possible with the conventional meat form shown at 10 in FIG. 1.

A variation of a device for squaring the ends of meat form 36 as shown in FIG. 5 may be employed. In this arrangement, the meat form 36 is encased within the cooking bag 38 and the mesh net 40, as previously described. A U-shaped bracket 42, usually formed of metal, includes a base 44 and upstanding legs or ends 46 which engage the ends of the meat form 36. The ends 46 may be formed by a plurality of grill elements 48, FIG. 6, and the grill type configuration of the ends 46 and base 44 permit the heat of the cooking atmosphere to fully surround the meat form 36.

The meat form is cooked while maintained between the bracket ends 46, and as the ends 46 will square the meat form ends this squared configuration will be retained after cooking is completed.

In FIG. 7, the meat form end portion is represented at 50, and the end of the meat form is represented at 52. The meat form may be located within the cooking bag 54 and is encompassed within the mesh net 56. The L-shaped element 58 is formed of a heat resistant thermoplastic composition and includes a base 60 having a leg 62 disposed at right angles to the base.

A sharp projection 64 is defined on the inner surface of the base 60 which penetrates the meat form 50 at a location remote from the end 52, and the interaction between the projection 64 and the meat form prevents movement of the element 58 relative to the meat form.

The embodiment of FIG. 7 may be located within the mesh net, and exteriorly of the cooking bag 54, and as the leg 62 is preferably formed of a solid thermoplastic material, the element is economical to manufacture and readily disposed of by the end user purchasing the prime rib beef so cooked and packaged.

FIG. 9 represents the end of another meat form 66 having an end 68, a cooking bag 70, a mesh net 72 having an end opening 73. The meat form shaping element 74 is in the form of an oval sheet material, such as of stainless steel, FIG. 10, and is located within the net 72 adjacent the meat form ends 68 so as to flatten and square the meat form ends. The element 74 is maintained in position by a pin 76 which is inserted through the openings in the net 72 as to be located outwardly of the element 74, and this construction permits the element 74 to be more quickly located within the net 72 as is the case with the forming element 28 in that the element 74 does not include any radially extending arms. The pin 76, having a grippable handle 78, may be readily inserted and removed from adjacent the associated element and the associated mesh net openings.

Figure 11:
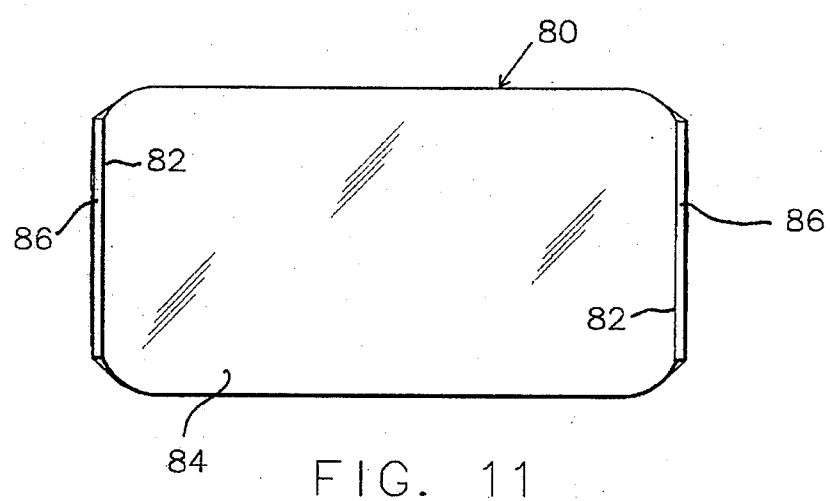
FIG. 11 is a side elevational view of a beef prime rib form encased within a shrink wrap envelope having substantially rigid elements located within the ends of the envelope engaging the meat form ends.

FIG. 11 illustrates another embodiment of the invention wherein the meat form is indicated at 80 having ends 82. The meat form is located within a shrinking cooking bag 84, and end shaping elements 86 are located within the bag 84 adjacent each of the meat form ends 82. In this embodiment, as shown in FIGS. 11 and 12, the meat form shaping elements 86 are maintained in compression by the cooking envelope or bag 84, and the elements 86 are discarded by the ultimate consumer after the bag is opened.

Figure 12:
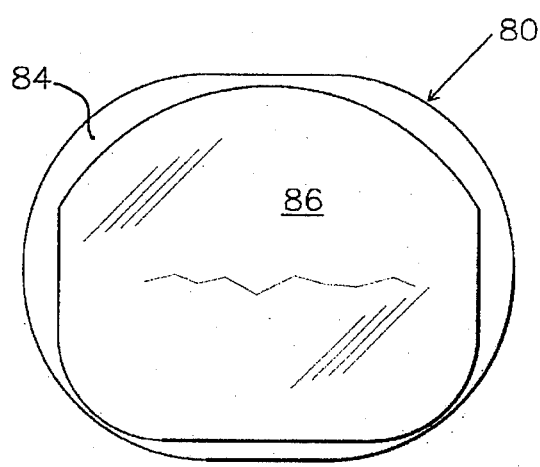
FIG. 12 is an end view of the meat form of FIG. 11.
Figure 13:
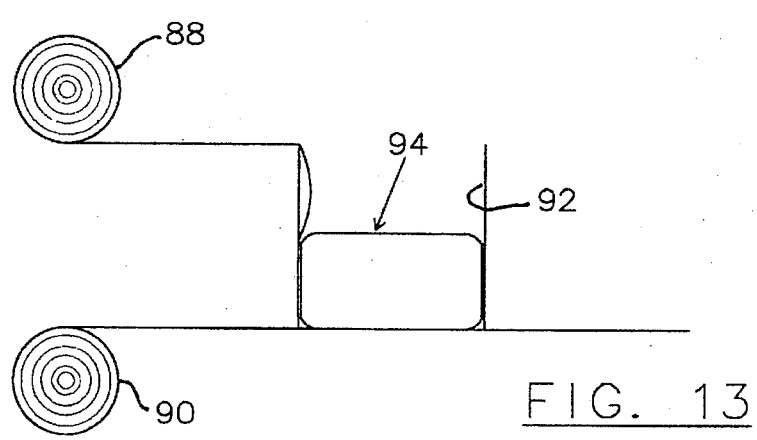
FIG. 13 is a schematic view of a roll stock packaging system utilizing the concepts of the invention.

The concept of the invention illustrated in FIGS. 11 and 12 may be employed with high production equipment such as schematically shown in FIG. 13. In FIG. 13, an upper reel 88 and a lower reel 90 dispense the cooking bag material which passes through the chamber 92 into which the meat form 80 has been placed. The meat form 80 passes from the chamber 92 and will have squared ends due to the confinement of the meat by the elements 86 as maintained in position by the elements 86.

From the aforedescriptions, it will be appreciated that a variety of devices may be employed to shape, confine and square the ends of a beef prime rib. The practice of the invention reduces meat waste and loss, results in a more aesthetically pleasing meat form, and the concepts of the invention may be practiced by one of ordinary skill.

It is appreciated that various modifications to the inventive concepts may be apparent to those skilled in the art without departing from the spirit and scope of the invention.

I claim:

1. The method of cooking a cut of beef wherein prior to cooking, the cut of beef is in an uncooked elongated form having a length defined by its ends which are thin or narrow relative to the rest of the elongated form, a circumferential periphery and a longitudinal axis extending through the ends and wherein after cooking, the form ends are substantially flat and perpendicular to the form axis, comprising the steps of:

a) confining the beef form circumferential periphery and its end in a cooking bag and then confining the beef form enclosed in said cooking bag in an open mesh net throughout the length and around the ends of said beef form, b) engaging a relatively rigid element within each end of the open mesh net such that the open mesh net holds the rigid elements relative to the meat form such that the rigid elements flatten the form ends and maintain the form ends in such flat configuration, substantially perpendicular to the beef form longitudinal axis, c) cooking the beef form while the rigid elements are engaged to cause the beef form to substantially maintain its flattened configuration, and then d) removing the relatively rigid elements from within the open mesh net without removing the open mesh net upon the completion of cooking whereby the beef form ends will substantially maintain their flat configuration.

2. The method of cooking a cut of beef wherein prior to cooking, the cut of beef is in an uncooked elongated form having a length defined by its ends which are thin or narrow relative to the rest of the elongated form, a circumferential periphery and a longitudinal axis extending through the ends and wherein after cooking, the form ends are substantially flat and perpendicular to the form axis, comprising the steps of:

a) confining the beef form circumferential periphery and its ends in a cooking bag and then confining the beef form enclosed in said cooking bag in an open mesh net throughout the length and around the ends of said beef form, b) engaging a relatively rigid element within each end of the open mesh net such that the open mesh net holds the rigid elements relative to the meat form such that the rigid elements flatten the form ends and maintain the form ends in such flat configuration, substantially perpendicular to the beef form longitudinal axis, and c) cooking the beef form while the rigid elements are engaged to cause the beef form to substantially maintain its flattened configuration.

* * * * *